(12) United States Patent
Parks (10) Patent No.: US 11,552,436 B2
(45) Date of Patent: Jan. 10, 2023

(54) TECHNIQUES FOR INTEGRATING WIRELESS FUNCTIONALITY IN A POWER OUTLET

(71) Applicant: Sapient Industries, Inc., Philadelphia, PA (US)

(72) Inventor: Samuel M. Parks, Philadelphia, PA (US)

(73) Assignee: Sapient Industries, Inc., Philadelphia, PA (US)

( * ) Notice: Subject to any disclaimer, the term of this patent is extended or adjusted under 35 U.S.C. 154(b) by 67 days.

(21) Appl. No.: 17/191,117

(22) Filed: Mar. 3, 2021

(65) Prior Publication Data

US 2021/0265793 A1 Aug. 26, 2021

Related U.S. Application Data

(63) Continuation of application No. 16/042,860, filed on Jul. 23, 2018, now Pat. No. 11,146,030.

(Continued)

(51) Int. Cl.
*H01R 25/00* (2006.01)
*H01R 13/652* (2006.01)
(Continued)

(52) U.S. Cl.
CPC ......... *H01R 25/006* (2013.01); *H01R 13/652* (2013.01); *H02J 3/14* (2013.01); *H02J 13/00004* (2020.01); *H02J 13/0005* (2020.01); *H02J 13/00007* (2020.01); *H02J 13/00022* (2020.01); *H02J 13/00024* (2020.01); *H02J 13/00026* (2020.01); *H02J 13/00028* (2020.01); *H04B 7/15507* (2013.01); *H04W 4/38* (2018.02); *G01K 7/00* (2013.01); *H01R 13/6658* (2013.01); *H01R 13/6675* (2013.01); *H01R 13/6683* (2013.01); *H01R 13/6691* (2013.01);

(Continued)

(58) Field of Classification Search
CPC .............. H01R 25/006; H01R 13/6675; H01R 13/6683; H01R 13/6691; H01R 13/70; H01R 2201/20; H01R 2201/24; H04W 4/38; H02J 13/00022; H02J 13/00007; H02J 13/0075; H02J 13/0082
See application file for complete search history.

(56) References Cited

U.S. PATENT DOCUMENTS

1,733,222 A 10/1929 Gehring
2,860,317 A 11/1958 Johnson
(Continued)

*Primary Examiner* — Manuel L Barbee
(74) *Attorney, Agent, or Firm* — Young Basile Hanlon & MacFarlane, P.C.

(57) ABSTRACT

A power control device is contained within a housing and has an electric current sensor configured to measure current passing through an electric outlet during a time period, a proximity sensor configured to detect a distance of an object relative to the electric outlet during the time period, a relay switch that can open or close to stop or conduct current through a circuit in the electric outlet in response to a command, and a wireless network interface in communication with the electric current sensor and the proximity sensor, the wireless network interface configured to transmit and receive data from the current sensor and the proximity sensor, to transmit commands to the relay switch, transmit the data to a computing device, and receive commands from the computing device.

20 Claims, 7 Drawing Sheets

Related U.S. Application Data (60) Provisional application No. 62/626,994, filed on Feb. 6, 2018, provisional application No. 62/536,288, filed on Jul. 24, 2017.

(51) Int. Cl.

| | | |
|---|---|---|
| *H01R 13/66* | (2006.01) | |
| *H01R 13/70* | (2006.01) | |
| *H02J 3/14* | (2006.01) | |
| *H02J 13/00* | (2006.01) | |
| *H04W 4/38* | (2018.01) | |
| *H04W 84/12* | (2009.01) | |
| *H04B 7/155* | (2006.01) | |
| *G01K 7/00* | (2006.01) | |
| *H01R 103/00* | (2006.01) | |
| *H04W 4/80* | (2018.01) | |

(52) U.S. Cl.
CPC .......... *H01R 13/70* (2013.01); *H01R 2103/00* (2013.01); *H01R 2201/02* (2013.01); *H01R 2201/20* (2013.01); *H01R 2201/24* (2013.01); *H04W 4/80* (2018.02); *H04W 84/12* (2013.01)

(56) References Cited

U.S. PATENT DOCUMENTS

| | | |
|---|---|---|
| 3,437,738 A | 4/1969 | Wagner |
| 4,839,716 A | 6/1989 | Butt |
| 5,060,114 A | 10/1991 | Feinberg et al. |
| 5,471,027 A | 11/1995 | Call et al. |
| 5,486,725 A | 1/1996 | Keizer et al. |
| 5,592,032 A | 1/1997 | Keizer et al. |
| 5,734,206 A | 3/1998 | Keizer et al. |
| 5,956,576 A | 9/1999 | Toy et al. |
| 6,508,595 B1 | 1/2003 | Chan et al. |
| 6,531,770 B2 | 3/2003 | Nakashima |
| 7,318,732 B2 | 1/2008 | Kidman |
| 7,964,989 B1 | 6/2011 | Puschnigg et al. |
| 8,702,446 B2 | 4/2014 | Gonzalez |
| 8,797,723 B2 | 8/2014 | Hilton et al. |
| 8,941,017 B2 | 1/2015 | Nagano |
| 9,007,186 B1 | 4/2015 | Krummey et al. |
| 9,013,283 B1 | 4/2015 | Tackaberry |
| 9,331,524 B1 | 5/2016 | Yetter |
| 9,484,695 B2 | 11/2016 | Puschnigg et al. |
| 9,705,330 B1 | 7/2017 | Yetter |
| 9,760,140 B1 | 9/2017 | Krummey et al. |
| 9,859,655 B2 | 1/2018 | Puschnigg et al. |
| 10,042,342 B1 | 8/2018 | Tyrrell et al. |
| 10,210,356 B2 | 2/2019 | Vechvittayakhlung |
| 10,622,770 B2 | 4/2020 | Parks |
| 11,101,609 B2 | 8/2021 | Parks |
| 2002/0086567 A1 | 7/2002 | Cash |
| 2003/0020289 A1 | 1/2003 | Dohrmann et al. |
| 2003/0227220 A1 | 12/2003 | Biskup et al. |
| 2005/0125083 A1 | 6/2005 | Kiko |
| 2005/0200284 A1 | 9/2005 | Thompson et al. |
| 2005/0235306 A1 | 10/2005 | Fima |
| 2008/0296047 A1 | 12/2008 | Kaji |
| 2009/0234512 A1* | 9/2009 | Ewing .................. G05B 15/02 700/295 |
| 2014/0203638 A1 | 7/2014 | Keswani et al. |
| 2014/0335803 A1 | 11/2014 | Rivera |
| 2015/0011208 A1 | 1/2015 | Terry |
| 2015/0236449 A1 | 8/2015 | Puschnigg et al. |
| 2015/0236453 A1 | 8/2015 | Magee, Jr. |
| 2015/0236490 A1 | 8/2015 | Purves et al. |
| 2015/0280410 A1 | 10/2015 | Elberbaum |
| 2015/0357762 A1 | 12/2015 | Green |
| 2016/0044447 A1 | 2/2016 | Tetreault et al. |
| 2016/0186973 A1 | 6/2016 | Chien |
| 2016/0372868 A1 | 12/2016 | Puschnigg et al. |
| 2017/0256941 A1 | 9/2017 | Bowers et al. |
| 2021/0104855 A1 | 4/2021 | Bayard et al. |

\* cited by examiner

FIG. 6 ns application a continuation of U.S. patent application

TECHNIQUES FOR INTEGRATING WIRELESS FUNCTIONALITY IN A POWER OUTLET

CROSS-REFERENCE TO RELATED APPLICATIONS

This application a continuation of U.S. patent application Ser. No. 16/042,860 filed on Jul. 23, 2018, which claims the benefit of priority under 35 U.S.C. Section 119(e) to U.S. Provisional Patent Application No. 62/626,994, filed Feb. 6, 2018, U.S. Provisional Patent Application No. 62/536,288, filed Jul. 24, 2017, the entire contents of which are incorporated herein by reference.

TECHNICAL FIELD

This invention relates to integrating wireless functionality in electric power outlets.

BACKGROUND

The average household has an ever-increasing number of electric devices plugged in at any time. Many of these devices are not used daily or only used for short periods of time, but are left plugged in. While plugged in, many of these electronics are still consuming standby power, sometimes referred to as "vampire current." Standby power is the electric power consumed by many consumer electronic devices when they are switched off but still plugged in, unnecessarily using energy and increasing costs. Some solutions include unplugging devices, or using smart electrical outlets that do single functions such as automatically shut off.

SUMMARY

The disclosure is based, in part, on the implementation of a system for electric outlets that collects data on the outlets, and controls the outlet to perform functions such as automatically stopping power to the outlet. The system uploads the collected data to the cloud to be used in other ways. The system uses the collected data to produce a profile for an individual to develop best strategies for saving money. The data collected includes the position of a person or their phone within the home, and the individual device current draw. The data collected is sent to the cloud to generate a profile for suggesting rules to a user, e.g., whether to automatically turn off device when the user has walked away. This data collection and profile creation can be done on a larger scale, such as a building.

In some implementations, a power control device is contained with a housing, the device comprising an electric current sensor configured to measure current passing through an electric outlet during a time period, a proximity sensor configured to detect a distance of an object relative to the electric outlet during the time period, a relay switch that can open or close to stop or conduct current through a circuit in the electric outlet in response to a command, and a wireless network interface in communication with the electric current sensor and the proximity sensor, the wireless network interface configured to transmit and receive data from the current sensor and the proximity sensor, to transmit commands to the relay switch, transmit the data to a computing device, and receive commands from the computing device.

In some instances the device comprises a second relay switch in communication with the wireless network interface that can open or close to stop or conduct current through a second circuit in the electric outlet in response to a command received by the wireless network interface. The object the proximity sensor is configured to detect is a user. The object the proximity sensor is configured to detect is an electronic device. The electronic device is a cell phone. The housing is sized to replace a standard electric outlet. The housing has plugs that connect the housing into standard holes in an electric outlet. The electric current sensor is configured to measure current with a sample rate between 0.1 Hz and 30 kHz.

In some implementations, a computing device implemented method includes receiving data representing power use of a power outlet over a period of time, receiving data representing a distance of an object relative to the power outlet during the period of time, developing a power usage profile using the collected power use and proximity data, and transmitting a command to the power outlet based on the usage profile to turn on or off in response to a condition.

In some instances the condition is a proximity of the object to the power outlet. The condition is a time of the day. The method comprises transmitting the collected power use and proximity data to a cloud storage, or developing a power usage profile comprises transmitting a notification request to a device requesting confirmation of a characteristic of the power usage profile. The characteristic is the type of device connected to the power outlet. The characteristic is a power-off schedule.

Further implementations include a system comprising a computing device comprising a memory configured to store instructions, and a processor to execute the instructions to perform operations comprising, receiving data representing power use of a plurality of power outlets and data representing a proximity of an object relative to the power outlets, developing a power usage profile using the collected power use and proximity data, and transmitting commands to the power outlet to turn on or off based on the usage profile.

In some instances, the computing device receives the data from a processor in wireless communication with the power outlet. The computing device transmits the command to the power outlet via a processor in wireless communication with the power outlet. Transmitting commands to turn on a one of the power outlets when the object is detected to be in proximity to that power outlet.

In further implementations, a system comprises a computing device comprising a memory configured to store instructions, and a processor to execute the instructions to perform operations comprising, receiving data representing power use of one or more power outlets received from one or more power sensors directly connected to the one or more power outlets, storing the data representing the power use of the one or more power outlets, developing power usage profiles using the collected power use data for each of the power outlets, and displaying the power usage profiles.

Advantages of the methods and systems described include the ability to perform electricity usage monitoring on a single chip, on a private wireless network, and provide user control over the outlet monitored. Advantages include the ability to do both on/off power control of an outlet as well as power usage sensing. These functions are performed for each socket of the outlet, rather than on a circuit-wide scale. The outlet per outlet monitoring control allows the devices plugged into each outlet to be identified, whereas trying to identify devices while monitoring an entire circuit would require physically unplugging all wires leading to a location (such as a home or office building) one by one. Other advantages include the ability to create a profile for both the user and the power outlet. Further advantages include the ability to implement security easily, and easy installation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 A-D are exemplary hardware components for use with the control system for FIG. 1.

Like reference symbols in the various drawings indicate like elements.

DETAILED DESCRIPTION

The disclosure is based, in part, on the implementation of a system for electric outlets that collects data on the outlets, and controls the outlet to perform functions such as automatically stopping power to the outlet. The system uploads the collected data to the "cloud" (e.g., remote servers) to be used in other ways. For example, the system uses the collected data to produce a profile for an individual to develop best strategies for saving power, and by extension, money. The data collected includes the position of a person or their phone within the home or building, and the individual device current draw. The data collected is sent to the cloud to generate a profile for suggesting rules to a user, e.g., whether to automatically turn off a device when the user has walked away.

This data collection and profile creation can be done on a larger scale, such as a building.

System Overview

Figure 1:
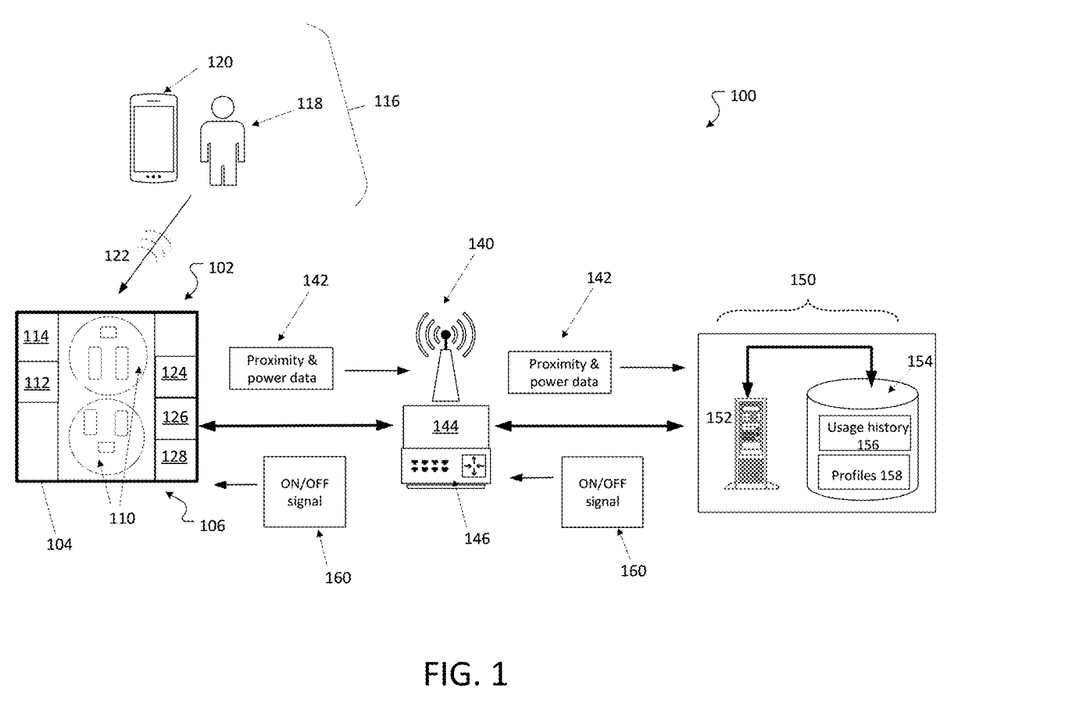
FIG. 1 is a schematic of a system for collecting the data at a power outlet and communicating the data to a control system to generate a control scheme.

FIG. 1 shows a schematic for an example outlet power control system 100.

The power control system 100 includes at least one power control device 102 installed at an electrical outlet location 106. Only one power control device 102 is shown for illustration in the figure, but the outlet power control system 100 can communicate with multiple power control devices 102 installed at multiple outlets in a space, such as an apartment, a house, or a building.

The power control device 102 is contained within a housing 104. In one implementation, the housing 104 plugs into the socket of a conventional electric outlet. In another implementation, the device housing 104 is sized to replace a standard electric outlet 106.

The power control device 102 has a faceplate with sockets 110 that electric devices are plugged into, similar to a conventional electrical outlet. The power control device 102 includes an electric current sensor 112. The electric current sensor 112 measures the current passing through the electric outlet location 106 of the power control device 102 as is known in the art. The electric current sensor 112 can measure the current passing through each socket 110 of the power control device 102, e.g., through each circuit that independently can be connected to a consumer device. The power control device 102 also includes a proximity sensor 114 within the device housing 104. The proximity sensor 114 detects the distance to, or the proximity of, an object 116 relative to the proximity sensor 114. The object 116 can be a user 118. In particular, the object 116 can be an electronic device such as the user's cell phone 120. As the user 118, or the cell phone 120 in the user's pocket, moves around the space, the proximity sensor 114 detects when the user 118 or the cell phone 120 is in proximity to the proximity sensor 114 by receiving proximity signal 122. In some implementations, the proximity sensor 114 detects the object 116 by using long range RFID detection. The user 118 can inserts a very small, paper-thin, RFID tag into the protective case of their phone 120 that is then picked up by the proximity sensor 114. Other implementations include long-range low-power Bluetooth, ultrasonic signal triangulation (produced by a phone speaker), and Wi-Fi signal strength.

The power control device 102 has a relay switch 124 connected to the wiring of the power control device 102. The relay switch 124 can open or close the circuit conducting electricity to the outlet location 106, to conduct or to stop the current flowing through the circuit. Each power control device 102 has as many relay switches 124 as there are sockets 110 in the particular power control device 102, for example, the power control device 102 in FIG. 1 has two sockets 110 and thus has a first relay switch 124 connected to a first of the sockets 110 and a second relay switch 126 connected to a second of the sockets 110. The power control device 102 can turn on and off the current flowing through each of the sockets 110 and by extension the current flowing to each of two separate devices that may be plugged into each of the sockets 110, eliminating vampire current, reducing unwanted power usage when consumer devices are left on when a person leaves a room, or leaves the home.

The power control device 102 measures the power that a plugged-in consumer device is using at any moment, sampling the current hundreds of times a second as well as where the detectable object 116 is with respect to the power control device 102. The electric current sensor 112 measures current using a sample rate between 0.1 Hz and 30 kHz.

The power control device 102 includes a wireless network interface 128 in communication with the proximity sensor 114 and the electric current sensor 112. The wireless network interface 128 collects the data from the sensors 112, 114. The wireless network interface 128 packages the data received from the sensors 112, 114, and the interface 128 then transmits both the proximity and power data, or outlet data 142, via the wireless network 140 to an access hub 144.

The network interface 128 can be, for example, a Wi-Fi chip. One example of a Wi-Fi chip is from Texas Instruments Inc.® (e.g., Texas Instruments "Simple Link CC3220SF12ARGKT"). Such a chip has capacity for additional built-in functions, so that a single chip can replace both a dedicated Wi-Fi chip that interfaces with the Internet and a dedicated processor for handling the information transmitted. Thus, the network interface 128 uses the single chip, which includes a web server, and adds additional functionality. This implementation is less expensive than many alternatives and can handle necessary functions so that each outlet has its own dedicated chip independently connected to the internet.

The access hub 144 is a private internet access computing device that interfaces with a wireless router 146. The access hub 144 connects to a conventional wireless router 146, e.g., by plugging into the router 146. The access hub 144 uses the wireless router 146 to transmit the received outlet data 142 to a power service manager 150. The power service manager 150 can be in the cloud.

The data service manager 150 includes a processor 152, and a memory or database 154. The database 154 saves all the outlet data 142 transmitted to the power service manager by the access hub 144 at various time intervals, which in some cases can vary. For example, when a user 118 plugs in a new consumer device, there will be several rapidly-sent packets of data used for determining the device that was plugged in. Nominal data upload rates may be slower, e.g., upperbound nominal rate of 1 packet every half second, lowerbound nominal rate of 1 packet every 5 minutes.

The processor 152 of the power service manager 150 interfaces with the database 154. The processor 152 has a program that uses the outlet data 142 stored as usage history 156 stored in the database 154 to develop power control profiles 158 for controlling the power of the power control device 102. Once a power control profile 158 has been developed, the power service manager transmits on/off signals 160 to the access hub 144 via the router 146. The access hub 144 transmits the on/off signals 160 via the wireless network 140 to the wireless network interface 128. The wireless network interface 128 in turn transmits on or off signals to the first relay switch 124 and/or the second relay switch 126. An on/off signal can be sent to any individual relay 124 or 126 at any given time.

Method of Power Control

Figure 2:
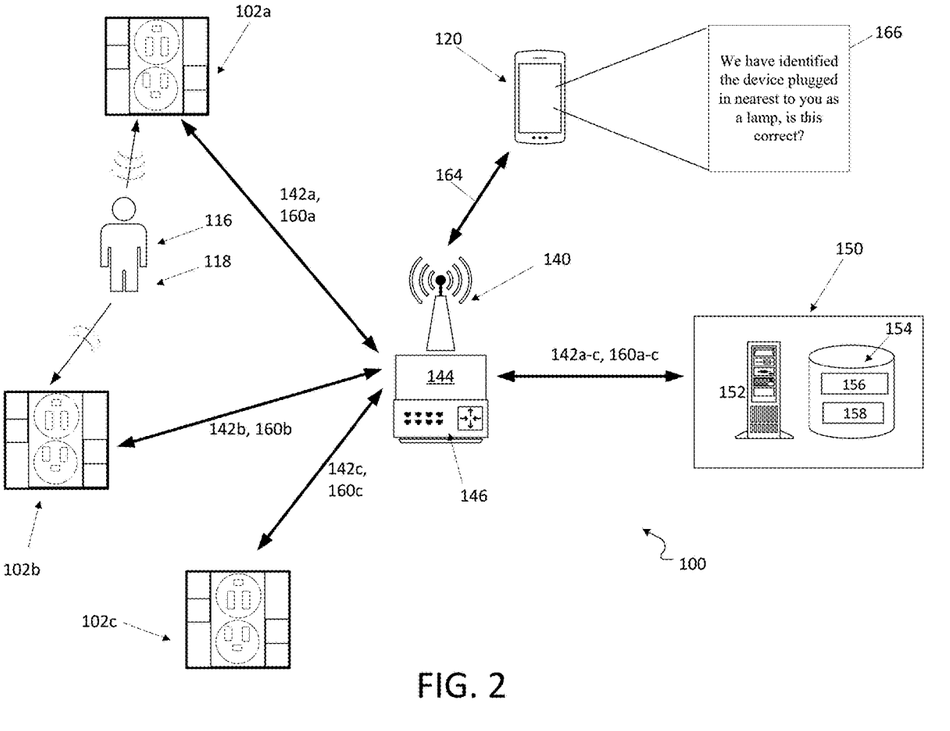
FIG. 2 is a schematic of data collection and control scheme generation for the system of FIG. 1.

Referring to FIG. 2, the outlet power control system 100 adds functionality to what were previously simple power outlets. The outlet power control system 100 interacts with multiple power control devices, depicted in FIG. 2 as power control devices 102a, 102b, 102c. FIG. 2 shows three power control devices 102a, 102b, 102c as an example, but the outlet power control system 100 can manage data and control more than three devices, for example more than 10 devices, more than 20 devices, or up to 80 devices.

Elements in FIG. 1 that are replicated for each of the control devices 102a, 102b, 102c in FIG. 2 are given the suffix a, b, c, and should be understood as being elements specific to that control device 102a, 102b, 103c, but otherwise similar to each other.

The information collected and analyzed by the outlet power control system 100 creates a personal profile for controlling each of the power control devices 102a, 102b, 102c, optimizing how electricity is used at the respective outlets, reducing both costs and environmental impact.

The access hub 144 plugs into the back of a router 146, creating a private access point to any of the associated smart outlets. Since each access hub 144 plugs directly into the router 146, it is relative easy to implement security. Initial set up of the power control system 100 is easier as well: with power control devices 102a, 102b, 102c installed, a user need only plug the access hub 144 into her router 146. The access hub 144 will automatically connect to the power service manager 150, receive instructions, and install all the power control devices 102a, 102b, 102c.

The method implemented by the power control system 100 includes receiving outlet data 142a, 142b, 142c representing the power use of multiple power outlets with installed power control devices 102a, 102b, 102c over a period of time. Each of the power control devices 102a, 102b, 102c also receives data at its respective proximity sensor 114a, 114b, 114c as the object of interest 116 moves around, representing the distance of the object 116 relative to each power control device 102a, 102b, 102c during the period of time. Those outlet data 142a, 142b, 142c are transmitted by each wireless network interface 128a, 128b, 128c to the access hub 144. The wireless router 146 relays the data from the access hub to the power service manager 150, which develops power control profiles 158a, 158b, 158c for each consumer device connected to power control devices 102a, 102b, 102c.

The power service manager 150 receives the collected power use and proximity outlet data 142a, 142b, 142c. The power service manager 150 develops power profiles 158 which include on/off commands 160a, 160b, 160c for each power control device 102a, 102b, 102c, in particular for each relay 124a 126a 124b 126b 124c 126c of each connected power control device. The access hub 144 receives the commands and transmits the on/off commands 160a, 160b, 160c to the respective power outlet.

The power control profiles 158 are based on the outlet data 142a, 142b, 142c received and stored in the database 154. The power control profiles 158 are algorithms that dictate that a particular power control device 102a, 102b, 102c should turn on or off in response to a particular condition. The condition could be the proximity of the object 116 to the respective power control device 102a, 102b, 102c. For example, a power control device 102a might turn on (e.g., relay switches 122a and 124a in the power control device 102a close to allow current to flow through the circuit) only when the proximity sensor 112a in the power control device 102a detects that the object 116 is a certain distance away, such as within 10 feet, or within 5 feet. The condition could be the time of the day. For example, another power control device 102b might turn on only during dark hours, or in the early morning. Control of power control device 102a, 102b, 102c should be understood to mean control over each socket 110 of a power control device 102a, 102b, 102c.

The outlet power control system 100 activates and deactivates the electricity provided to a consumer device plugged into to a power control device 102 by learning the behavior of the user 118. The user 118 initializes the power control system 100 by plugging the access hub 144 into her router 146, which then connects all the power control devices 102a, 102b, 102c to the power service manager 150. The data acquisition phase begins.

During the data acquisition phase the power control devices 102a, 102b, 102c simply collect power usage and proximity data and transmits them to the power service manager 150. The power service manager 150 does not send on/off signals 160a, 160b, 160c back to the power control devices 102a, 102b, 102c. The power service manager 150 simply collects the data and stores them in the database 154.

The power service manager 150 begins to analyze the stored data that accumulate over time. After enough data has been collected (e.g., enough time has elapsed), the power service manager 150 begins to infer what type of consumer devices are plugged into the sockets of the power control devices 102a, 102b, 102c. Different electronic consumer devices exhibit characteristic power usage and user proximity characteristics that allow them to be classified into different product types. For example, a toaster might be plugged into power control device 102c (e.g., a socket 110 of the power control device 102c). A toaster draws relatively high current for a short period of time (e.g., 5 minutes or less), which the electric current sensor 112c in device 102c will record. The proximity sensor 114c in device 102c will also record that the object 116 (e.g., the user 118) is very close (e.g., within 2 feet) immediately before the electric current sensor 112c begins to record the high power draw. The outlet data 142 sent includes time information, which in this case indicates that this usage pattern generally occurs in the morning hours, such as before 9 a.m. After enough time (e.g., 2 days, 3 days or more) the power control manager 150 will determine that the consumer device plugged into the power control device 102c exhibits repeatable power and proximity characteristics that correspond to those of a toaster, as a person walks up to it in the morning and starts it to draw enough power to make toast.

Device characteristics stored in the database 154 allow the power control manager 150 to identify a range of consumer devices plugged into the power control devices 102a, 102b, 102c. In another example, the power control manager 150 could receive data from a power control device 102b indicating that the consumer device plugged into the power control device 102b is using power at a constant rate, and for several hours. The power control manager 150 might also record that the power usage at power control device 102b occurs during early morning and/or evening and night hours. The power service manager might then determine that a lamp is plugged into a socket 110 of the power control device 102b. The time required to identify the type of device can vary from a few hours to several days.

The power control manager 150 also uses the accumulated data to infer the lifestyle of the user 118 over time. For example, the times the user 118 typically leaves or returns home is determined from the changes in power usage recorded over several days as well as the detection of the user via proximity sensing. Or, for example, that the user 118 prefers to leave a lamp on all night for safety, or a certain outlet is used exclusively for phone charging.

Once the power control manager 150 has collected enough data on the user 118 it enters the profile development phase. Developing a power usage profile 158 or control scheme includes transmitting a notification message to the user 118 requesting confirmation of a characteristic of the power usage profile, such as the type of consumer device plugged into a power control device 102. The power control manager 150 begins to identify the consumer devices in use, and interacts with the user 118 to verify.

A verification signal 164 is sent to the user 118, for example in the form of a notification message 166 that is integrated into an app on the user's cell phone 120. A typical notification message 166 might be requesting confirmation of the type of consumer device plugged into a specific power control device 102 that the system has identified, e.g., "we have identified the device plugged in nearest to you right now is a lamp, is this correct?" If the user 118 confirms the identification (e.g., by interacting with the app on the phone 120), the power control manager 150 designates that consumer device as the identified device type and continues to build a profile for that power control device 102. If the user 118 indicates the identification is incorrect, the system can re-enter the data collection phase. In some instances the cost savings will be presented with each notification message 166.

The profile development phase and data accumulation phase can overlap.

In some instances the app on the cell phone 120 has options so the user can identify the plugged in consumer devices manually. The user can also skip the data acquisition phase altogether by specifying rules immediately upon plugging a device in.

Power control profiles 158a, 158b, 158c include rules for powering or disconnecting various power control devices 102a, 102b, 10c based on their type and their usage. A profile 158c for the toaster plugged into a power control device 102c for example, would be implemented by the power control manager 150 sending an on/off command 160c to the power control device 102c to turn off the power to the circuit for most of the day. In the morning, an on/off command would turn the power control device 102c back on. The profile may include sending an off command 160c when a certain criteria is met, such as the user 118 is no longer detected anywhere in the house, or that it is 9 a.m. and past the time the user 118 typically makes toast.

Another example profile 158 could be for a desktop computer. People often keep computers on all the time (e.g., so that software updates etc., can install automatically) and a profile 158 that identified the consumer device plugged into a particular power control device 102a could therefore include an always-on command in the on/off signal 160a.

Another example profile 158 might be that when a user is detected for the first time in several hours (e.g., returns home from work and walks through door), an on command 160 is sent to a favorite lamp. The user could leave the lamp on without wasting electricity, since the on/off signal 160 would generally keep the outlet off and only permit power usage when the user was in the room.

The profiles 158a, 158b, 158c could include defaults, such as all power control devices 102a, 102b, 102c receive power when the user is home. Specific profiles 158 could be changed for specific devices.

Notification messages 166 are sent to the user 118 to confirm such schedules and profiles 158 as they are developed by the power service manager 150. For example, the notification message 166 can ask for confirmation of the power on or power off schedule proposed for a specific power control devices 102a, 102b, 102c. The app can include overrides, so that a user can, for example, make toast in the afternoon.

Notifications 166 that a user could receive include a "New device" notification. This type of notification is sent immediately upon plugging in a new consumer device that is detected by the system 100 and the user will have the option to specify the kind of consumer device if desired. The goal of this notification is to take care of all learning associated with the consumer device plugged in, especially if it is a permanent device.

The notification will prompt the user to select from three types of rules: "Schedule", "Proximity", and "Charging". Upon selecting one of the options, a screen allows for selecting preset settings. The preset settings for rules are likely good starting places for the power service manager 150 to begin refining rules according to the user's pattern. The presets for the "Schedule" rule include Day/Night Schedule, Workday, Savings, and Timer. Savings allows scheduling to turn a consumer device as soon as it reaches a certain cost for the time period (e.g., a month), while Timer scheduling turns a consumer device off after a certain amount of time it has been used in a month. The presets for the "Proximity" rule include Arrive in Room, Arrive home, In a Room for a Specific Duration, and Leave a Room. There are options to maintain power if it is clear the user is still using the device, or if the device is on, etc.

The combination of a rule and its specific parameters (or presets, until they're refined) form a "Habit". In one implementation, the user specifies what kind of consumer device is plugged in, sets a Habit, and the system then refines the Habit parameters.

A second kind of notification 166 can be sent if the user ignores the first notification upon plugging a consumer device in. This second notification is sent when a likely Habit has been deduced, shows the amount likely to be saved if the Habit is approved, as well as the details of the Habit itself (what kind of rule, and the parameters of the rule). The user can click "accept" to this notification, and also have the opportunity to optionally provide some more helpful information about the device at this stage (like what kind it is).

The third kind of notification sent to a user is the "Recon notification". The goal of this notification is to gain information about a device from the user that will aid in developing a Habit. Such a notification may ask: "We think this is a laptop, is that right?" or "You seem to use this outlet for the same device frequently, would you like us to make a note of that to apply the same Habit upon plugin?"

Once identified, the types of consumer devices plugged into various power control devices 102a, 102b, 102c can be analyzed to identify the different rooms in the dwelling. For example, the room with the identified toaster is labeled the kitchen, while a room with only a lamp can be designated a bedroom. An example profile 158 could be to provide power to all the power control devices 102 labeled with a specific room designation when the user 118 enters the room. A "Recon notification" could then ask a user a question such as "is this device in the kitchen?"

When the power control manager 150 makes a schedule or rule, all protocols are implemented via access hub 144, which tells access each power control device 102a, 102b, 102c to turn on or off. The power control devices 102a, 102b, 102c passively wait for signals 160a, 160b, 160c to signal a change in power state.

Figure 3:
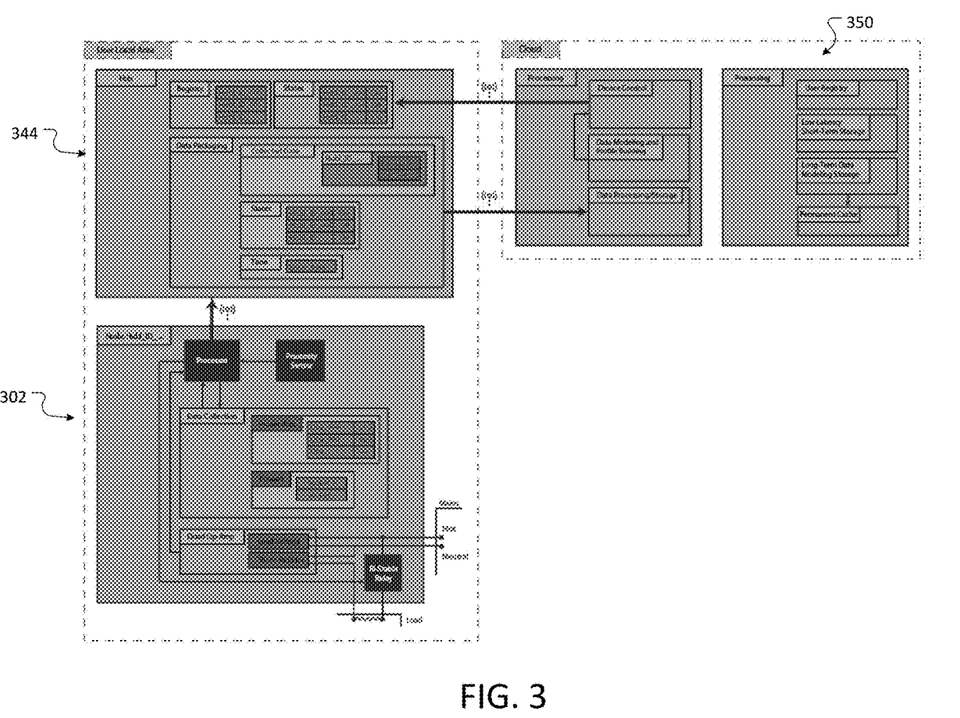
FIG. 3 is a schematic of the control system for FIG. 1.

FIG. 3 shows exemplary distribution of data and commands between a power control device 302, access hub 344, and power service manager 350 (e.g., the power control manager 150).

Figure 4:
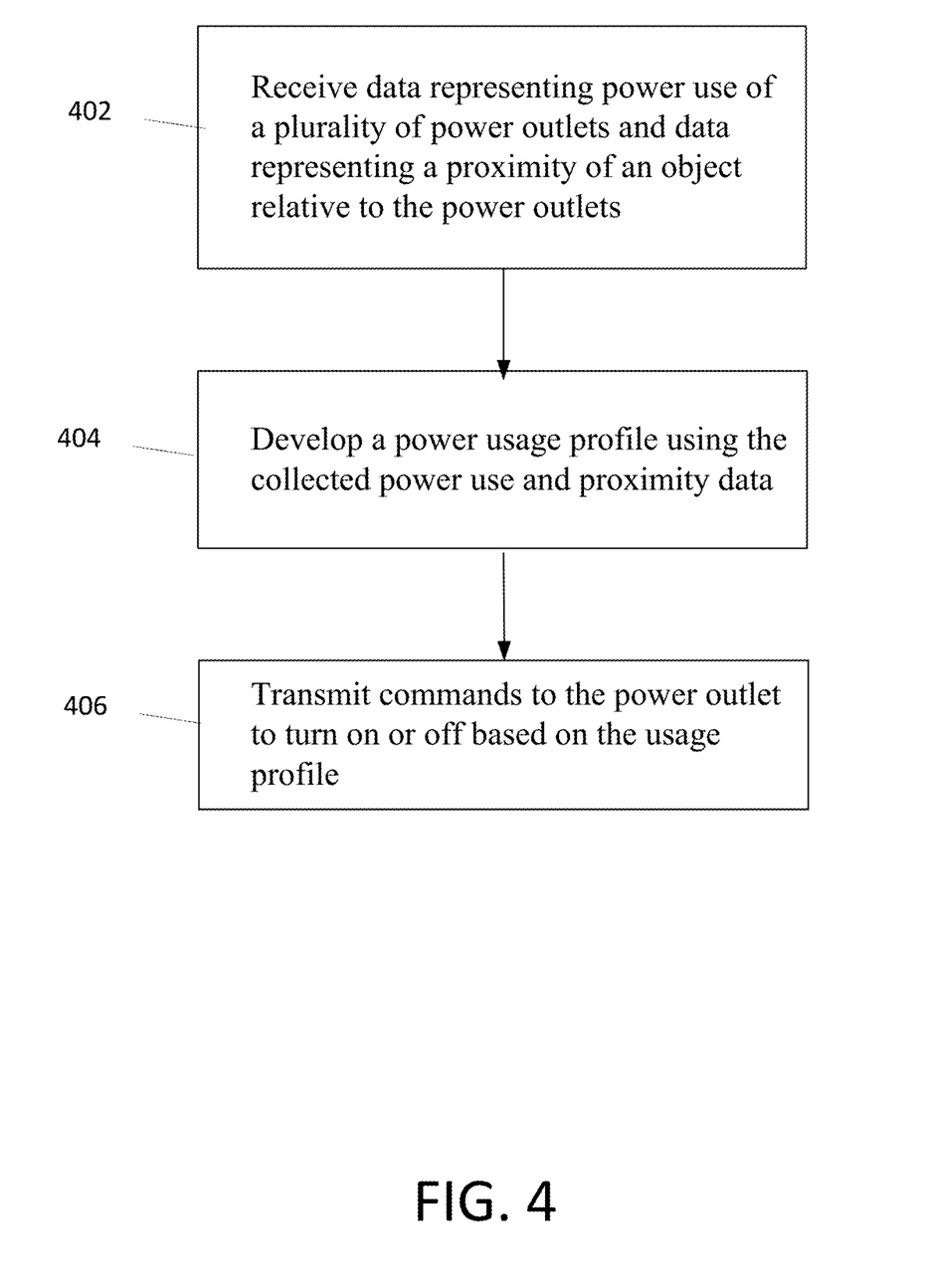
FIG. 4 is a flowchart for generating power control scheme using the system of FIG. 1.

FIG. 4 shows flow chart for the power control system 100 to manage the power of multiple power control devices 102. At step 402, the power control system 100, specifically the power service manager 150, receives data representing outlet data 142 which includes the power use of a plurality of power outlets 106 with installed power control devices 102, and data representing the proximity of an object 116 relative to the power outlet locations 106 for a time period. At step 404, the power service manager 150 develops a power usage profile 158 using the collected power use and proximity data 142. At step 406, the power service manager 150 transmits commands 160 to the power outlets 106 to turn on or off based on the developed usage profile 158.

Hardware Implementations

FIGS. 5A-D show example hardware components for a power control device 502. A conventional wall outlet is replaced with power control device 502. The housing 504 of the power control device 502 includes front piece 510 with sockets that assembles with side wall 512. Together the front piece 510 and a side wall 512 mate with an inner wall housing 506, the wall-insert block being previously placed in the outlet location 106, which is typically a hole in a wall cut for a conventional outlet. For ease of installation, the assembled housing 504 slides into the installed inner wall housing 506 (FIG. 5C), the inner wall housing 506 having an attached faceplate 514. The space inside the housing 504 accommodates the electric current sensor 112, proximity sensor 114, and wireless network interface 128. The power control device 502 can be installed in a wall and replace traditional outlets to give monitoring and control capability.

Figure 5A:
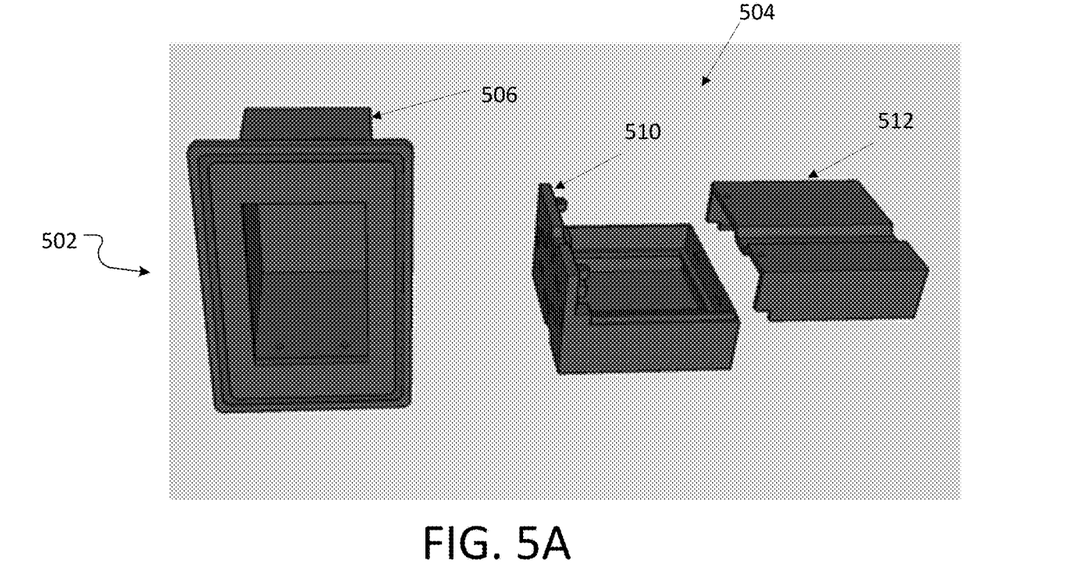
Figure 5B:
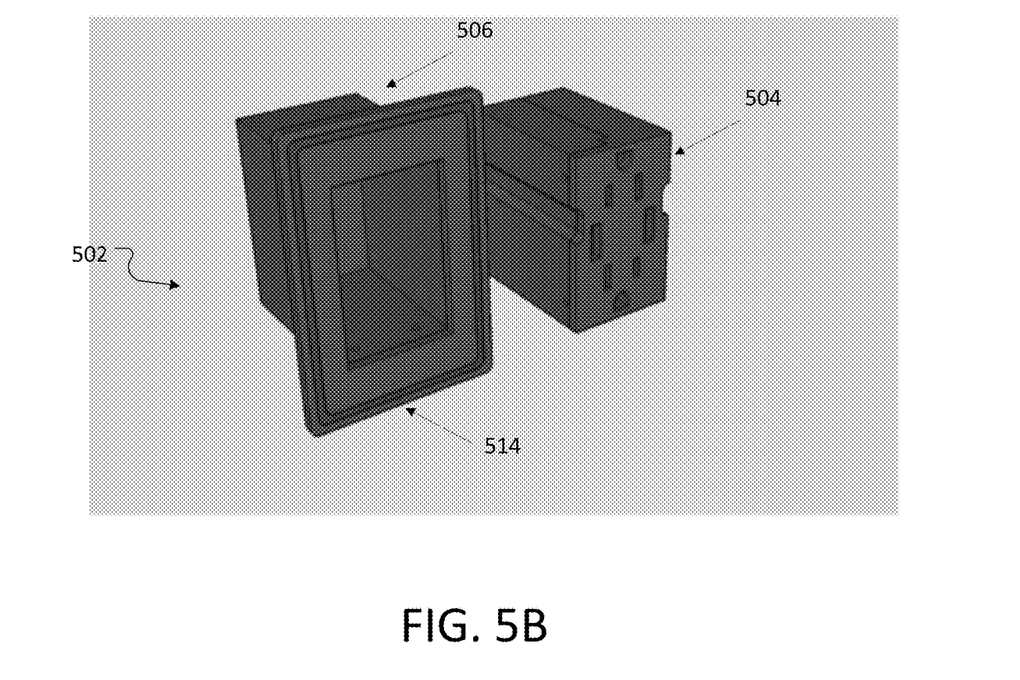
Figure 5C:
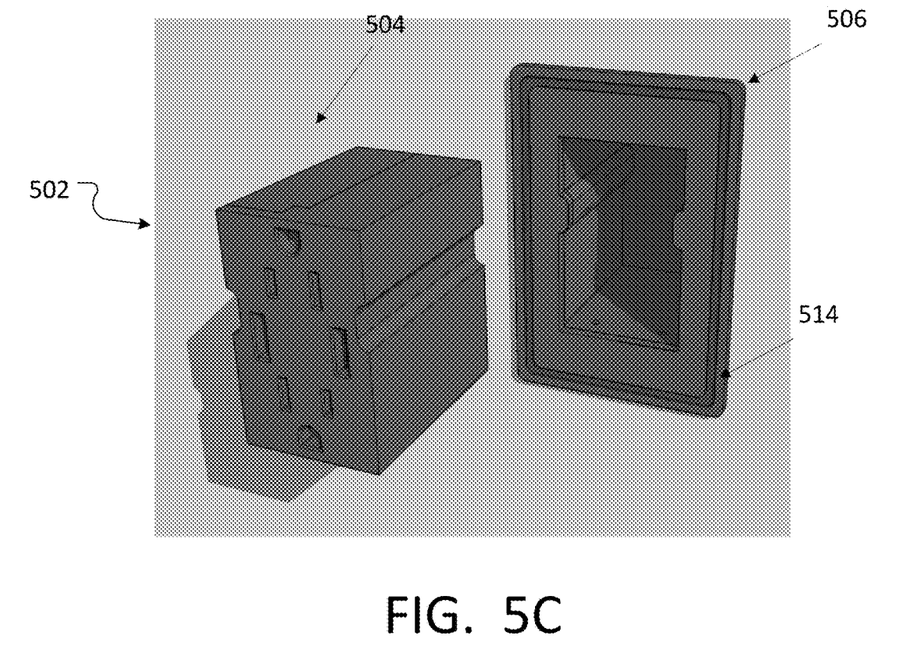
Figure 5D:
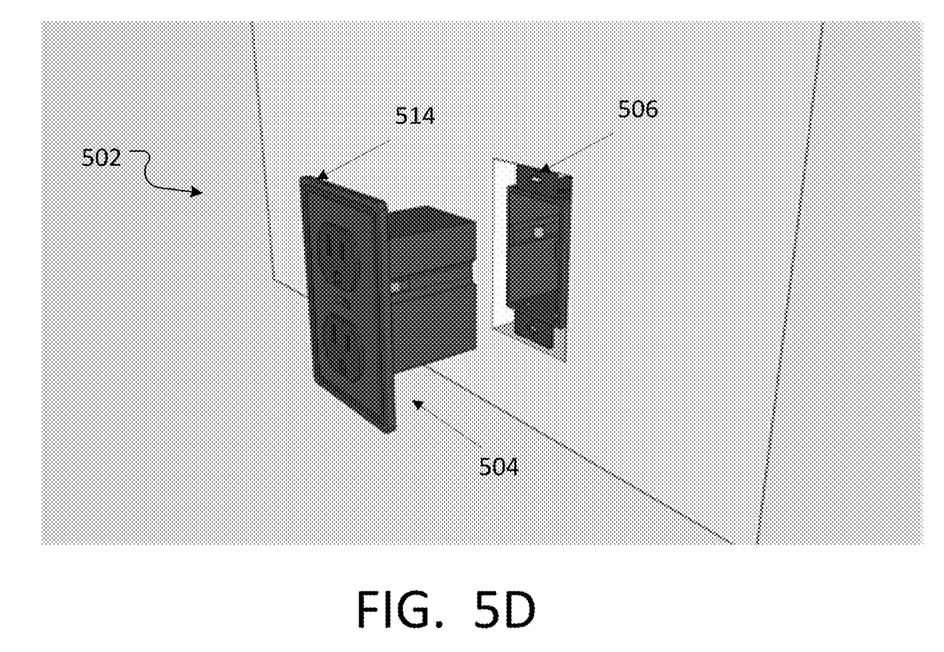

In another embodiment in FIG. 5D, the face plate 514 is attached to the housing 504 rather than the inner would housing 504. When assembled, the power control device 502 of FIGS. 5A-C and of FIG. 5D both appear as conventional outlets.

In some embodiments, the housing 504 has plugs on the back of the housing 504. Rather than sliding into the wide or mating with the inner wall housing 514, the device plugs into the socket of a traditional outlet.

Non-Consumer Applications

The power control system 100 can be used for implementations other than for household use. The power control system 100 can be implemented for larger scale uses, such as a floor of an office building, an entire building such as an office, school, or dormitory, or an entire city block. The managers responsible for electricity delivered to such sites can learn about how energy is being used and distributed. The power service manager 150 may generate reports for such a purpose, either periodically or upon request. An energy manager can understand when and how electricity is being used, and implement suitable profiles 158. For example, the power service manager 150 may recognize that a floor of a building is not occupied during certain hours and develop a profile 158 to disconnect power to the HVAC system or overhead lighting supplying that floor during those times, but not disconnect power to lights or computers. The power service manager 150 may send notifications as discussed above to the energy manager to approve such changes. Alternatively, the building manager may independently send such a rule to be implemented into the profile after viewing outlet data previously collected.

Another non-consumer application of the power control system is in manufacturing and production. In this implementation, power control devices 102 are installed for each machine in use on a factory floor. The power control system 100 monitors the power consumed by each individual machine, allowing manufacturers to learn the cost of each machine and so understand their overhead better. A manufacturing-focused system may not include the proximity sensors 114 installed in the power control devices 102 or relays 124 and 126. Such a system may instead receive data representing power use of the power outlets monitored by the power sensors directly connected to the power outlets, and store the data representing the power use of the individual power outlets. The power service manager may develop power usage profiles using the collected power use data for each of the power outlets, and display the power usage profiles to a user.

Additionally, other features of the system may be absent, such as generation and implementation of profiles 158. The power control system would monitor power consumption of individual machines on the scale of an entire plant or factory.

Figure 6:
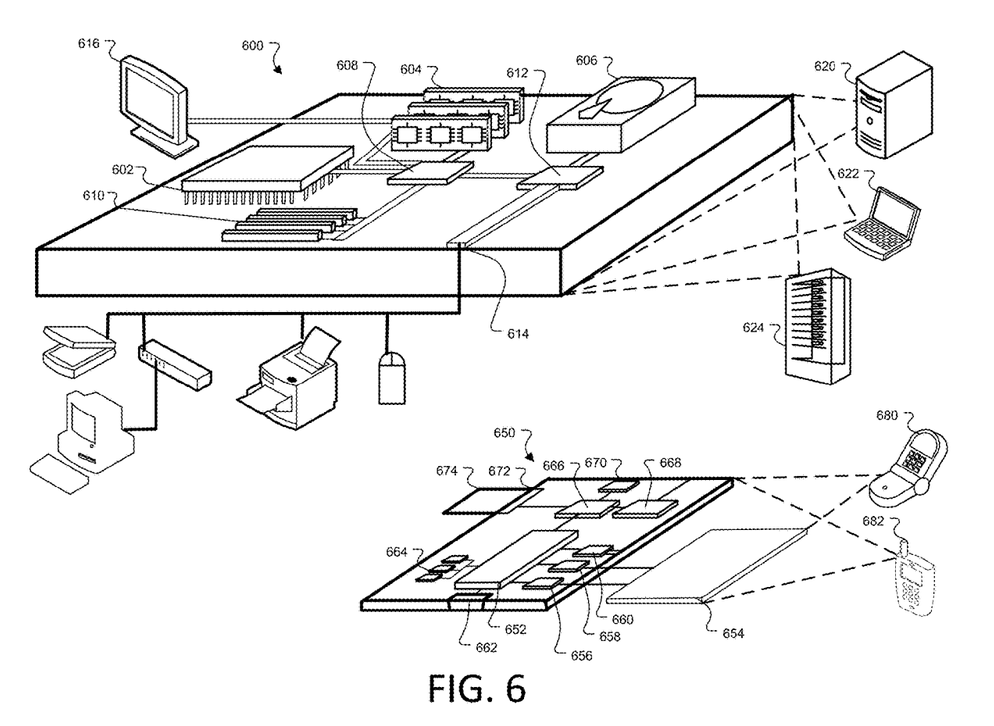
FIG. 6 illustrates an example of a computing device and a mobile computing device that can be used to implement the techniques described here.

FIG. 6 shows an example computer device 600 and example mobile computer device 650, which can be used to implement the techniques described herein. For example, a portion or all of the operations of the power service manager 150 may be executed by the computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low speed interface 612 connecting to low speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606, to display graphical data for a GUI on an external input/output device, including, e.g., display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

Memory 604 stores data within computing device 600. In one implementation, memory 604 is a volatile memory unit or units. In another implementation, memory 604 is a non-volatile memory unit or units. Memory 604 also can be another form of computer-readable medium, including, e.g., a magnetic or optical disk.

Storage device 606 is capable of providing mass storage for computing device 600. In one implementation, storage device 606 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 604, storage device 606, memory on processor 602, and the like.

High-speed controller 608 manages bandwidth-intensive operations for computing device 600, while low speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, the low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer (e.g., laptop computer 622). In some examples, components from computing device 600 can be combined with other components in a mobile device (not shown) (e.g., device 650). Each of such devices can contain one or more of computing device 600, 650, and an entire system can be made up of multiple computing devices 600, 650 communicating with each other.

Computing device 650 includes processor 652, memory 664, and an input/output device including, e.g., display 654, communication interface 666, and transceiver 668, among other components. Device 650 also can be provided with a storage device, including, e.g., a microdrive or other device, to provide additional storage. Components 650, 652, 664, 654, 666, and 668, may each be interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for the coordination of the other components of device 650, including, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations. Multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 850 through expansion interface 672, which can include, for example, a SIMM (Single In Line Memory Module) card interface. Such expansion memory 674 can provide extra storage space for device 650, and/or may store applications or other data for device 650. Specifically, expansion memory 674 can also include instructions to carry out or supplement the processes described above and can include secure data. Thus, for example, expansion memory 674 can be provided as a security module for device 650 and can be programmed with instructions that permit secure use of device 650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 664, expansion memory 674, and/or memory on processor 652, which can be received, for example, over transceiver 668 or external interface 662.

Device 650 can communicate wirelessly through communication interface 666, which can include digital signal processing circuitry where necessary. Communication interface 666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, including, e.g., using a Bluetooth®, Wi-Fi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken data from a user and convert it to usable digital data. Audio codec 660 can likewise generate audible sound for a user, including, e.g., through a speaker, e.g., in a handset of device 650. Such sound can include sound from voice telephone calls, recorded sound (e.g., voice messages, music files, and the like) and also sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments of the invention have been described. Nevertheless, it will be understood that various modifications may be made without departing from the spirit and scope of the invention. Accordingly, other embodiments are within the scope of the following claims.

What is claimed is:

1. A device comprising:
an electric current sensor configured to measure current passing through an electric outlet;
a proximity sensor configured to detect a distance of an object relative to the electric outlet; and
a wireless network interface in communication with the electric current sensor and the proximity sensor, the wireless network interface configured to transmit and receive data from the electric current sensor and the proximity sensor, to transmit the data to an access hub via a router, and to receive commands from the access hub, wherein the access hub plugs into the router to create a private access point for the device.

2. The device of claim 1, further comprising:
a relay switch that can open or close to stop or conduct current through a circuit in the electric outlet in response to a command, wherein the wireless network interface is further configured to transmit commands to the relay switch.

3. The device of claim 2, further comprising:
a second relay switch in communication with the wireless network interface that can open or close to stop or conduct current through a second circuit in the electric outlet in response to a command received by the wireless network interface.

4. The device of claim 1, wherein the object the proximity sensor is configured to detect is a user.

5. The device of claim 1, wherein the object the proximity sensor is configured to detect is an electronic device.

6. The device of claim 5, wherein the electronic device is a cell phone.

7. The device of claim 1, wherein the device is contained within a housing that is sized to replace a standard electric outlet.

8. The device of claim 7, wherein the housing has plugs that connect the housing into standard holes in the standard electric outlet.

9. The device of claim 1, wherein the electric current sensor is configured to measure current with a sample rate between 0.1 Hz and 30 kHz.

10. A method comprising:
receiving, from an access hub configured to create a private access point for a power outlet, power use data representing power use of the power outlet;
receiving, from the access hub, proximity data representing an object relative to the power outlet;
developing a power usage profile using the power use data and the proximity data; and
transmitting, to the access hub, a command to the power outlet based on the usage profile to turn on or off in response to a condition.

11. The method of claim 10, wherein the condition is a proximity of the object to the power outlet.

12. The method of claim 10, wherein the condition is a time of the day.

13. The method of claim 10, further comprising:
transmitting the power use data and the proximity data to a cloud storage.

14. The method of claim 10, wherein developing a power usage profile comprises:
transmitting a notification request to a device requesting confirmation of a characteristic of the power usage profile.

15. The method of claim 14, wherein the characteristic is a type of device connected to the power outlet.

16. The method of claim 14, wherein the characteristic is a power-off schedule.

17. A system comprising:
a memory configured to store instructions; and
a processor configured to execute the instructions to perform operations comprising:
receiving, from an access hub configured to create a private access point for power outlets, first data representing power use of one or more of the power outlets and second data representing proximity data relative to the one or more of the power outlets;
developing a power usage profile using the first data and the second data; and
transmitting, to the access hub, commands to the one or more of the power outlets to turn on or off based on the power usage profile.

18. The system of claim 17, wherein the first data is received from one or more power sensors directly connected to the one or more of the power outlets, wherein the operations further comprise:
storing the first data;
developing power usage profiles using the first data and the second data for each of the power outlets; and
displaying the power usage profiles.

19. The system of claim 17, wherein the access hub is in wireless communication with the power outlet via a router.

20. The system of claim 17, wherein the operations further comprise:
transmitting, to the access hub, commands to turn on one of the power outlets when an object is detected to be in proximity to that power outlet.

* * * * *